S. T. SANFORD.
BORING MACHINE.
No. 9,845.
PATENTED JULY 12, 1853.
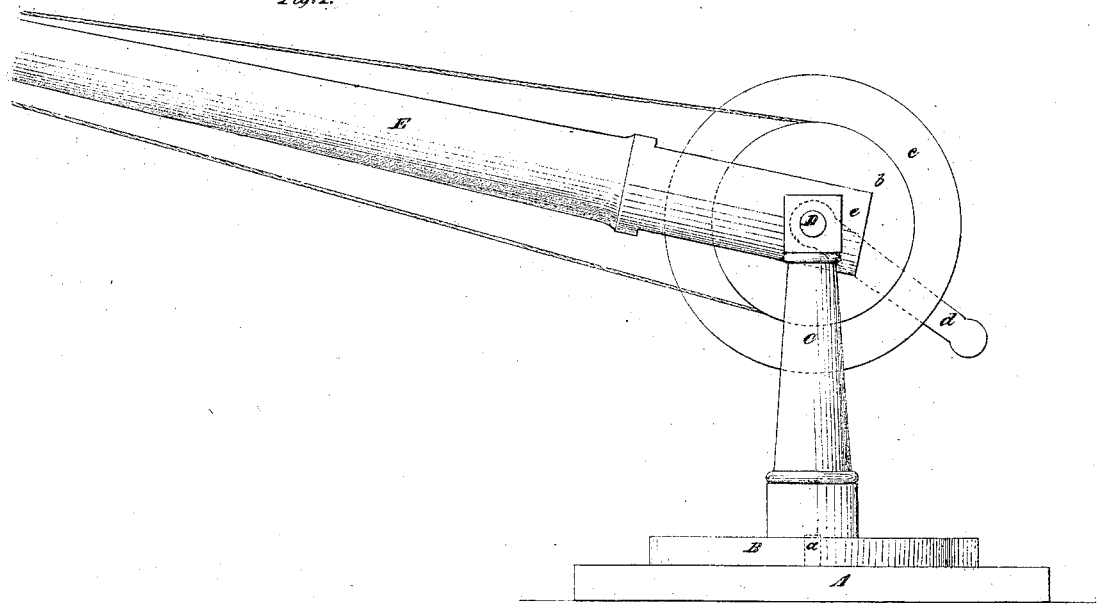
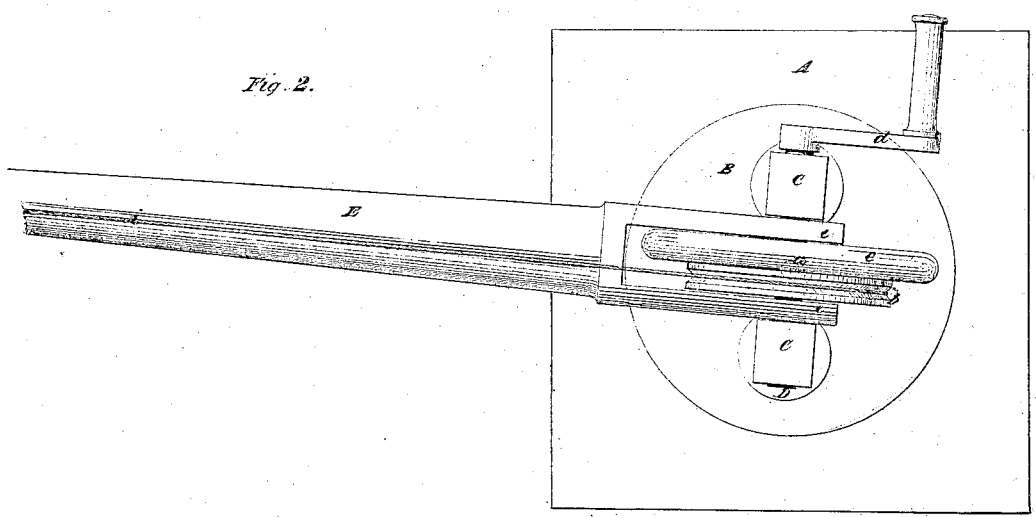
Only part of Drawing Accessible 1913.

UNITED STATES PATENT OFFICE.

SAMUEL T. SANFORD, OF FALL RIVER, MASSACHUSETTS.

BORING-MACHINE.

Specification of Letters Patent No. 9,845, dated July 12, 1853.

*To all whom it may concern:*

Be it known that I, SAMUEL T. SANFORD, of Fall River, in the county of Bristol and State of Massachusetts, have invented certain new and useful Improvements in Machines for Boring Treenail-Holes in Ships or other Vessels; and I do hereby declare that the following is a full, clear, and exact description of the same, reference being had to the accompanying drawings, forming part of this specification, in which—

Figure 1, is a side view of a machine, constructed according to my improvements. Fig. 2, is a plan of the same.

Similar letters of reference indicate corresponding parts, in both figures.

The nature of this invention consists in fitting the auger to a stock, which is connected by a ball and socket or other universal joint, with a long pole, which is attached to a suitable standard or base, in such a manner as to move in horizontal and vertical arcs; and, in giving revolution to the auger, by means of a pulley, which is fitted to its shank, and driven by a band from another pulley, which is fitted to a shaft working in the base or standard. The attachments of the pole allow the auger to be easily brought to any required point in the bottom or any other part of a vessel, and to be held in position to bore in any direction. The power to bore is applied on the ground, or other place where it may be convenient for the base of the machine to stand, where it is more advantageously used than when applied directly to the auger, owing to the frequent inconvenient positions of the latter, for working it by hand.

To enable those skilled in the art to make and use my invention, I will proceed to describe its construction and operation.

A, is the base or bed-piece, of the machine.

B, is a table capable of turning on a pivot, $a$, shown dotted in both figures; this table carries two uprights, C, C, in the upper parts of which are the bearings of the shaft, D, which carries a band pulley, $b$, and a fly-wheel, $c$, and which is furnished with a crank, $d$, or other suitable means of giving it rotary motion.

E, is a long pole, whose butt end, $e$, is slotted to receive the fly-wheel, $c$, and pulley, $b$, and is fitted easily to the shaft, D, which serves as a center upon which it moves.

F, is the auger-stock, which is slotted to receive a pulley, $f$, which is secured to a hollow shaft, $g$, which turns freely in bearings on opposite sides of the slot. G, is the auger, whose shank fits easily in the hollow shaft, $g$, in which it is capable of moving longitudinally, but not turning; being fitted with a feather and groove. The stock is fitted to the end, $h$, of the pole, E, with a ball and socket joint, $m$, which enables it to move circularly or radially in any direction. A band, $i$, serves to transmit motion from the pulley, $b$, to the pulley, $f$, which serves to rotate the auger. This band passes through guides, $n$, $n$, on the stock, near the joint, which serve to preserve an equal tension of the cord, in the various positions of the stock. A screw-thread is cut in the shank of the auger; and there is a tongue, $j$, pivoted to the back of the stock, which may be made to engage in the screw-thread, for the purpose of withdrawing the auger by means of its revolution. The stock is furnished with a metal guard, $k$, which half encircles the auger, and protects it; and the end of this guard is furnished with small sharp pins, $l$, $l$, which serve to pierce the planking of the vessel, before entering the auger, and thus allow it to be easily kept in place.

The auger is allowed a very considerable sweep, while the base of the machine remains stationary, and may be brought to any point in a large area of surface. Any part of the vessel may be reached. The stock requires to be held in the proper position to enter the auger; and then the shaft, D, being set in motion, the hole is rapidly bored. When the hole is bored to the required depth, the tongue, $j$, is brought into gear with the screw on the shank of the auger, and the auger is made to withdraw itself.

What I claim as my invention and desire to secure by Letters Patent, is,

Fitting the auger stock, F, by a ball-and-socket, or other universal joint, to an arm, E, which is connected with a fixed base or standard, so as to be capable of moving in arcs at any angle to each other; and, giving rotary motion to the auger so arranged, by means of a pulley attached to the auger, and a band receiving motion from a pulley on a shaft, at the butt end of the pole or arm, substantially as herein described.

SAMUEL T. SANFORD.

Witnesses:
ALMANZA S. LINDSEY,
JOHN LINDSEY.